(12) United States Patent
Reiser

(10) Patent No.: US 6,858,337 B2
(45) Date of Patent: Feb. 22, 2005

(54) REVERSIBLE FUEL CELL POWER PLANT

(75) Inventor: Carl A. Reiser, Stonington, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 157 days.

(21) Appl. No.: 10/330,815

(22) Filed: Dec. 27, 2002

(65) Prior Publication Data
US 2004/0126629 A1 Jul. 1, 2004

(51) Int. Cl.[7] .............................................. H01M 8/00
(52) U.S. Cl. ...................... 429/13; 429/12; 429/17; 429/18; 429/19; 429/20; 429/21; 429/22; 429/23; 429/26; 429/32; 320/101
(58) Field of Search ............................. 429/13, 19, 12, 429/17–23, 26, 32; 320/101

(56) References Cited

U.S. PATENT DOCUMENTS

| | | | |
|---|---|---|---|
| 3,870,565 A | * | 3/1975 | Bonnemay et al. ............ 429/27 |
| 6,024,848 A | | 2/2000 | Dufner et al. |
| 6,322,915 B1 | | 11/2001 | Collins et al. |
| 6,432,566 B1 | | 8/2002 | Condit et al. |
| 6,601,402 B2 | * | 8/2003 | Dunham ........................ 62/271 |

* cited by examiner

Primary Examiner—Michael Barr
Assistant Examiner—Gentle E. Winter
(74) Attorney, Agent, or Firm—Malcolm J. Chisholm, Jr.

(57) ABSTRACT

The invention is a reversible fuel cell power plant (10). A reactant switch-over assembly (48) is secured between a reducing fluid fuel source (30), an oxygen containing oxidant source (24), and first and second flow fields (20) (22) of a fuel cell (12). The switch-over assembly (48) first directs a reducing fluid fuel stream to flow into the first flow field (20) while it simultaneously directs the oxygen containing oxidant stream to flow into the second flow field (22). Then, after a first half of a useful life span of the fuel cell (12) but before a final one quarter of the useful life span, the switch-over assembly (48) directs the reducing fluid fuel stream to flow into the second flow field (22) while it simultaneously directs the oxygen containing oxidant stream to flow into the first flow field (20).

10 Claims, 4 Drawing Sheets

REVERSIBLE FUEL CELL POWER PLANT

TECHNICAL FIELD

The present invention relates to fuel cell power plants that are suited for usage in transportation vehicles, portable power plants, or as stationary power plants, and the invention especially relates to directing reactant streams to differing flow fields of a fuel cell at some point in the life span of the power plant to extend the life of the power plant.

BACKGROUND ART

Fuel cell power plants are well known and are commonly used to produce electrical energy from hydrogen containing reducing fluid and oxygen containing oxidant reactant streams to power electrical apparatus such as motors, and transportation vehicles, etc. In fuel cell power plants of the prior art, it is well known that fuel cell performance decays over time.

Fuel cell performance decay is due to several related phenomena. One such cause of performance decay is corrosion that takes place on electrodes, and especially on cathode electrodes. Cathode electrodes are exposed to a corroding oxidative environment as a result of the presence of an oxygen rich oxidant fluid within the cathode environment, while anode electrodes are exposed to a non-corroding, reducing environment as a result of the presence of a hydrogen rich reducing fluid fuel within the anode environment. An additional cause of decay arises from reduction of activity of an electrocatalyst making up part of a cathode or anode electrode due to a change in composition of the catalyst resulting from oxidative corrosion or due to recrystalization of the catalyst. Mass transfer characteristics of the cathode or anode electrode structure may be reduced due to oxidation of materials within the electrode that increase the wettability of the electrode. Such oxidation may result in flooding of the electrode with an electrolyte of an aqueous electrolyte, or with product water of a proton exchange membrane ("PEM") electrolyte. Further, the electrolyte in the fuel cell may become contaminated by reaction, adsorption and absorption of foreign materials, thereby reducing conductivity of the electrolyte. It is known that these performance decay phenomena are generally most severe on the cathode electrode because of the influence of the cathode potential and oxidant on these degradation mechanisms. Therefore, degradation at the cathode electrode leads to significant performance loss of the cathode electrode and the fuel cell.

The amount of catalyst required for the anode or fuel electrode is less than an amount of catalyst required for the cathode or oxidant electrode because the oxygen reduction reaction at the cathode electrode in most known fuel cells is much slower than the fuel oxidation reaction at the anode electrode. Additionally, known fuel cells are frequently designed having a rectangular shape defining a short axis and a long axis. The oxidant reactant stream in such fuel cells is typically passed through the cell in a direction parallel to the short axis, and the fuel reactant stream is passed through the cell in a direction parallel to the long axis of the cell. Such an approach tends to minimize a depth of reactant flow channels and maximizes a number of fuel cells per unit length of a fuel cell stack assembly, which is an important design element. Consequently, efforts to minimize cathode electrode degradation must confront limitations of a traditional, rectangular plan form of known fuel cells. It is desirable, therefore, to develop a fuel cell power plant that minimizes performance decay resulting from degradation of the cathode electrode.

DISCLOSURE OF INVENTION

The invention is a reversible fuel cell power plant for generating electrical current from hydrogen containing reducing fluid fuel and oxygen containing oxidant reactant streams. The power plant includes at least one fuel cell having a first electrode and a second electrode secured to opposed surfaces of an electrolyte, having a first flow field for directing a reactant stream to pass adjacent to the first electrode, and having a second flow field for directing a reactant stream to flow adjacent to the second electrode. A reactant switch-over assembly is secured in fluid communication between a reducing fluid fuel source, an oxygen containing oxidant source, and the first and second flow fields. The switch-over assembly provides for alternating between a first position and a second position. In the first position, the switch-over assembly directs the reducing fluid fuel stream to flow into the first flow field and directs the oxygen containing oxidant stream to flow into the second flow field. In the second position, the switch-over assembly directs the reducing fluid fuel stream to flow into the second flow field and directs the oxygen containing oxidant stream to flow into the first flow field.

The invention includes a method of operating the reversible fuel cell power plant including the steps of first directing the reducing fluid fuel stream to flow into the first flow field of the fuel cell, while simultaneously directing the oxygen containing oxidant stream to flow into the second flow field of the fuel cell. After the fuel cell has been operated in that manner, the fuel cell power plant is controlled so that the reducing fluid fuel stream is directed to flow into the second flow field of the fuel cell while simultaneously the oxygen containing oxidant stream is directed to flow into the first flow field of the fuel cell.

By switching over the reactants to the different flow fields, the useful life of a fuel cell or fuel cells within a power plant will be significantly extended. It is stressed that switching the reactants over to different flow fields as described above would be done only once, or at most only several times during the expected life span of a fuel cell. For example if a fuel cell had an expected useful life span of ten units of time (e.g., ten years), an optimal extension of the useful life span would be achieved by switching the reactant streams over to different flow fields after the first half of the useful life span, and before the final one third of the useful life span, such as during the sixth time unit. It is anticipated that switching over the reactants to different flow fields will extend the useful life of the fuel cell, or fuel cells in a well known fuel cell stack assembly, by as much as 100% or more.

In a preferred embodiment, the first electrode of the fuel cell is identical to the second electrode, meaning that the first electrode includes the same catalyst, catalyst loading, same support material if utilized, and the same mass and volume as the second electrode. Similarly, the first flow field is identical to the second flow field, meaning that the first flow field defines the same volume and dimension of pores, channels, passageways, or cavities, etc. as the second flow field. Because the first and second electrodes and first and second flow fields are identical to each other, the fuel cell will operate efficiently whether the fuel or oxidant reactant stream is directed through either flow field to pass adjacent either electrode.

In an additional preferred embodiment, the power plant includes a coolant flow field secured adjacent the fuel cell.

The coolant flow field includes a coolant inlet, a coolant outlet and a split path coolant distribution channel between the coolant inlet and coolant outlet for directing flow of a coolant stream between the coolant inlet and coolant outlet. The split path coolant distribution channel directs some of a coolest portion of the coolant stream within the coolant flow field to flow from the coolant inlet over a first flow field inlet and outlet, and it directs some of the coolest portion of the coolant stream to flow from the coolant inlet over a second flow field inlet and outlet. By structuring the coolant flow field to maintain the inlets and outlets of both flow fields as cool as possible, the coolant flow field assists in keeping the fuel cell in water balance by minimizing loss of water through evaporation into the reactant streams moving through the flow fields, whether the reactant stream is the oxidant or fuel reactant.

Accordingly, it is a general purpose of the present invention to provide a reversible fuel cell power plant that overcomes deficiencies of the prior art.

It is a more specific purpose to provide a reversible fuel cell power plant that minimizes the performance impact of degradation of cathode electrodes of the plant.

It is yet another purpose to provide a reversible fuel cell power plant that significantly extends a useful life span of fuel cells of the plant.

These and other purposes and advantages of the present reversible fuel cell power plant will become more readily apparent when the following description is read in conjunction with the accompanying drawing.

DESCRIPTION OF THE PREFERRED EMBODIMENTS

Figure 1:
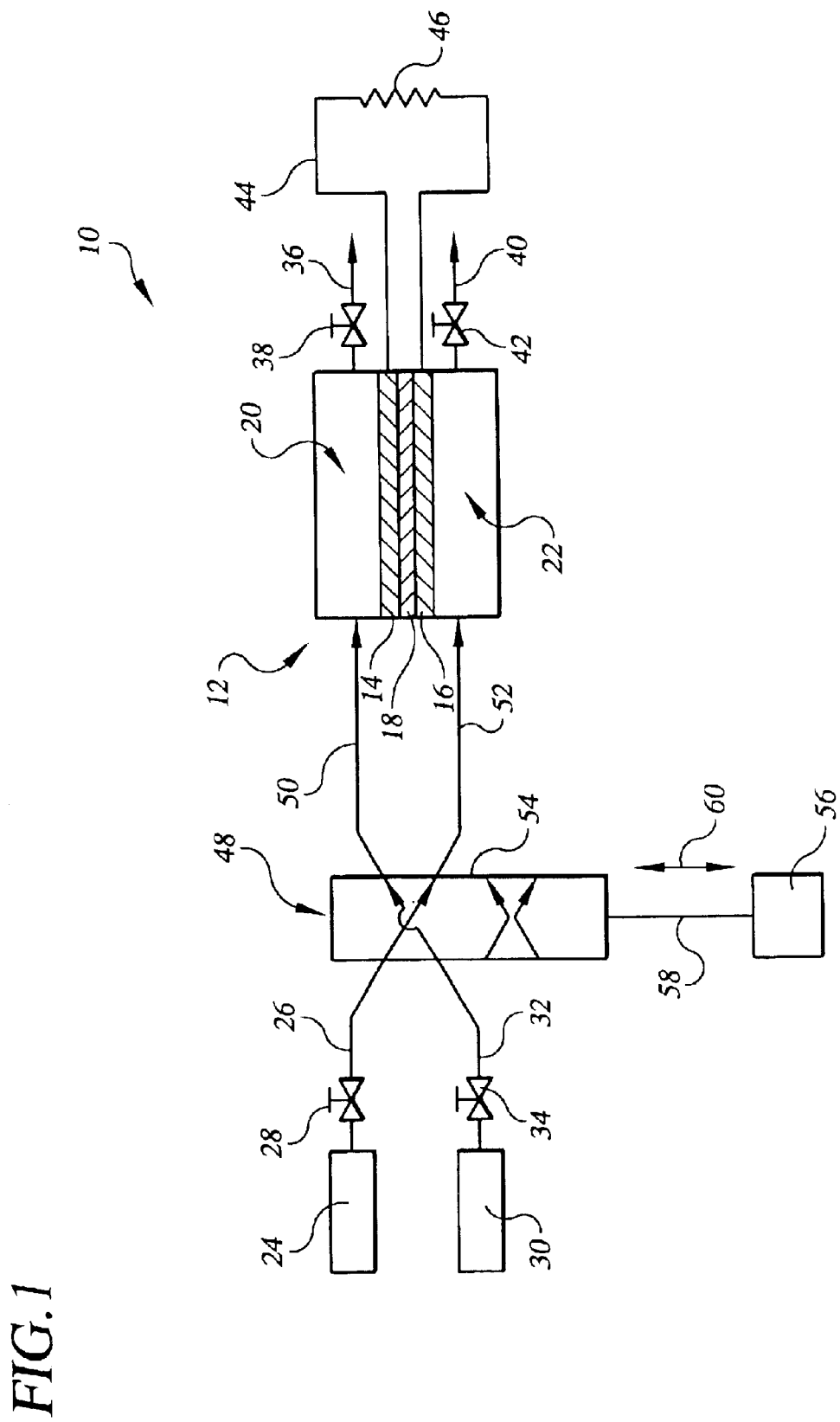
FIG. 1 is a schematic representation of a reversible fuel cell power plant constructed in accordance with the present invention.

Referring to the drawings in detail, a reversible fuel cell power plant is shown in FIG. 1, and is generally designated by the reference numeral 10. The power plant 10 includes a fuel cell 12 having a first electrode 14, a second electrode 16, and an electrolyte 18 disposed between the first and second electrodes 14, 16. A first flow field 20 is defined adjacent to the first electrode 14, and a second flow field 22 is defined adjacent to the second electrode 16. The electrolyte 18 may be in the form of a proton exchange membrane ("PEM") of the type described in U.S. Pat. No. 6,024,848, or the electrolyte may be held within a ceramic matrix, such as is typically found in acid aqueous electrolyte fuel cells, such as phosphoric acid or alkaline, or molten salt electrolyte or solid oxide fuel cells.

The power plant 10 also includes an oxygen containing oxidant source 24 secured in fluid communication with an oxidant feed line 26 having an oxidant inlet valve 28 secured thereto. The oxidant source 24 may be a container for the oxygen containing oxidant, or may be air, etc., as is well known. A hydrogen reducing fluid fuel source 30 is secured in fluid communication with a fuel feed line 32, which has a fuel inlet valve 34 secured to the line 32. A first flow field exhaust line 36 is secured in fluid communication with the first flow field, and includes a first flow field vent valve 38 secure to the line 36. A second flow field exhaust line 40 is secured in fluid communication with the second flow field 22, and includes a second flow field exhaust valve 42 secured to the line 40. An external circuit 44 is secured in electrical communication with the fuel cell 12, and the circuit 44 includes a primary load 46 such as an electric motor that receives the electrical current that is generated by the fuel cell 12 through the external circuit 44.

The power plant 10 also includes a reactant switch-over assembly 48 secured in fluid communication with the oxygen containing oxidant source 24, such as through the oxidant inlet line 26, with the reducing fluid source 30, such as through the fuel inlet line 32, with the first flow field 20, such as through a first flow field inlet 50, and with the second flow field 22, such as through a second flow field inlet 52. It is noted that the first and second flow field inlets 50, 52 may be in the form of pipe lines, or manifolding known it the art. The switch-over assembly 48 may be a switch-over assembly means for alternating between a first position, as shown in FIG. 1, wherein the switch-over assembly means 48 directs the reducing fluid fuel reactant stream to flow from its source 30 into the first flow field inlet 50 and first flow field 20, and directs the oxygen containing oxidant reactant stream to flow from its source 24 into the second flow field inlet 52 and second flow field 22, and a second position, wherein the switch-over assembly means 48 directs the reducing fluid fuel stream to flow into the second flow field inlet 52 and second flow field 22, and directs the oxygen containing oxidant stream to flow into the first flow field inlet 50 and first flow field 20.

The switch-over assembly means 48 may be any apparatus, system, or procedure known in the art that is capable of changing the flow of the reducing fluid and oxidant reactant streams as described above. For example, it is anticipated that the reversible fuel cell power plant 12 may be operated for up to one-half to two thirds of a useful life span of the fuel cell 12 (or, as is well known in the art, of a fuel cell stack assembly (not shown)) with the switch-over assembly means 48 in the first position, and then the switch-over assembly means 48 may place the flow of the reactant streams in the second position for the remaining life span of the fuel cell 12.

The switch-over assembly means 48 therefore may include plumbing, manifolding or other reactant stream conduits being simply re-positioned manually by an operator (not shown) for changing the flow of the reactant streams from the first to the second position of the switch-over assembly means 48. The switch-over assembly means 48 may also include a mechanism 54 that automatically switches flow of the reactant streams from the first to the second position, as shown schematically at reference numeral 54 in FIG. 1. Such a mechanism 54 may include a controller means 56 for selectively adjusting the mechanism 54 from the alignment shown schematically in FIG. 1, wherein the reactant streams flow according to the switch-over assembly means 48 being in the first position, to the mechanism 54 being aligned to direct the reactant streams to flow according to the switch-over assembly means 48 being in the second position described above.

The controller means 56 may include an actuator 58 secured between the controller means 56 and the mechanism 54 for controlling the position of the mechanism 54, as suggested by the bi-directional arrow 60, wherein the controller moves the actuator 58 which in turn moves the mechanism 54 to adjust flow of the reactant streams between the switch-over assembly 48 being in position one or position two. The controller means 56 may be any controller known in the art that is capable of adjusting flow of the reactant steams according to the switch-over assembly 48 being in position one or position two. Such controller means may include manual control, a mechanical actuator, electrical actuator, electromagnetic actuator, hydraulic actuator, or such actuators integrated with a timer mechanism, or a sensor system that detects fuel cell parameters, such as voltage, current, power, efficiency, operating time, etc., to control operation of the switch-over assembly means 48.

It is pointed out that, in the event the first and second flow field exhaust lines 36, 40 direct flow field exhaust streams into downstream power plant 10 systems, such as fuel processing or reactant stream humidification systems (not shown) known in the art, then an exhaust stream switch-over means (not shown) would be necessary to switch the exhaust streams into appropriate aspects of those downstream power plant systems. One skilled in the art could readily modify the switch-over assembly 48 for such purposes. Similarly, external circuit 44 connections to the primary load 46 would have to be reversed whenever the switch-over assembly 48 switches flow of the reactant streams through the fuel cell 12 flow fields 30, 22. One skilled in the art could readily implement such a change in the external circuit 44 by switching means known in the art.

Figure 2:
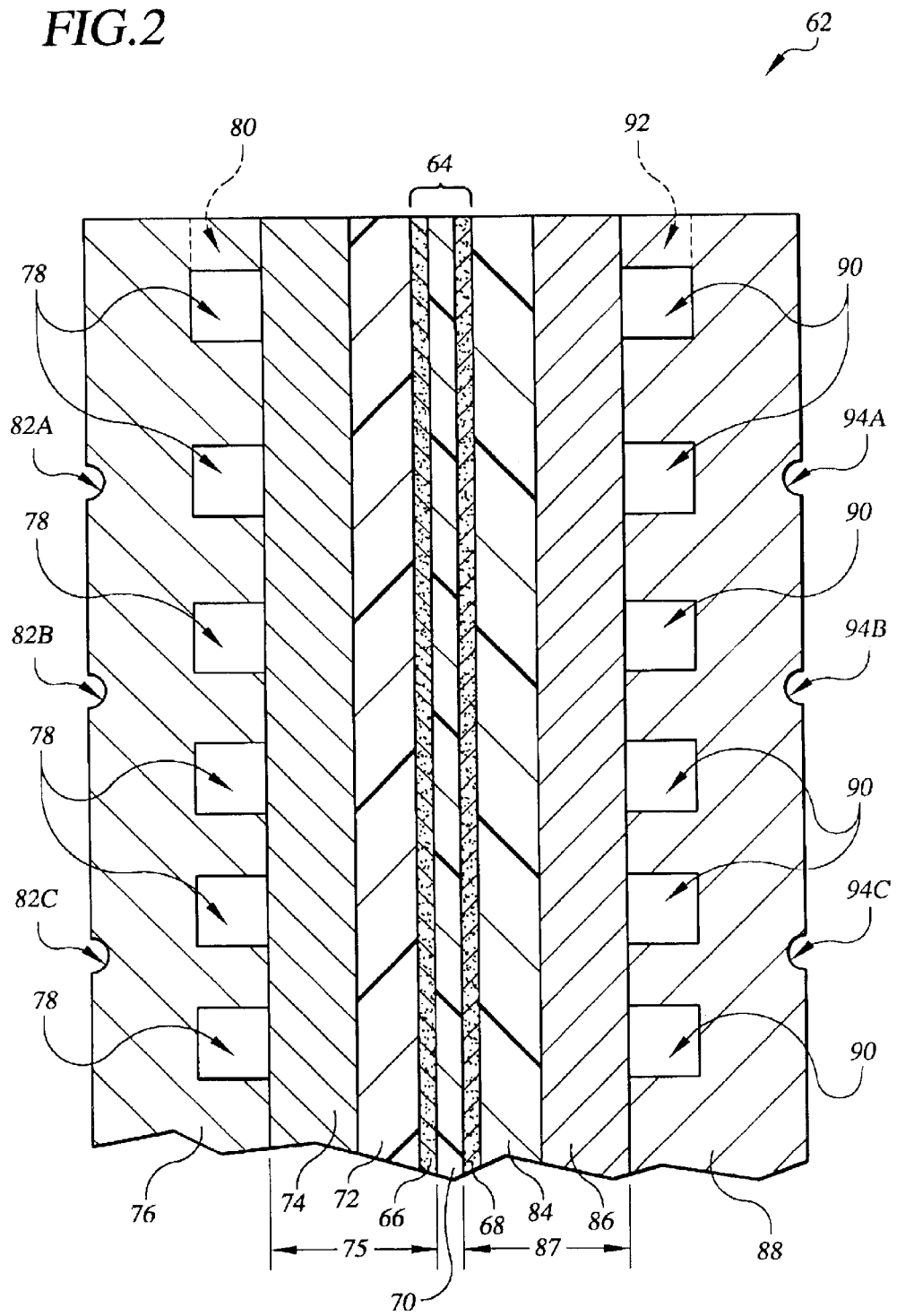
FIG. 2 is a schematic, fragmentary cross-section view of a preferred fuel cell appropriate for a reversible fuel cell power plant.

As shown in FIG. 2, a preferred fuel cell 62 may include a membrane electrode assembly 64 consisting of a first preferred catalyst 66, a second preferred catalyst 68 secured to opposed sides of a preferred electrolyte 70. The preferred fuel cell 62 may also include a first catalyst support means, consisting of one or more porous layers for supporting the first catalyst 66 and permitting fluid flow through the first support means. The one or more porous layers of the first electrode support means may include a first diffusion layer 72 secured adjacent to the first preferred catalyst 66 and a first substrate layer 74 secured adjacent to the first diffusion layer 72. The first preferred catalyst 66, first diffusion layer 72 and first substrate layer 74 may be cooperatively secured to define a first preferred electrode 75. A first water transport or cooler plate 76 is also secured adjacent to first electrode support means such as adjacent to the first substrate layer 74. The first water transport plate 76 is secured in fluid communication with a known thermal management system (not shown) for directing a coolant stream to flow through the first water transport plate to remove heat from the fuel cell 62, and to possibly also remove product water from the fuel cell 62, to be directed from the fuel cell 62, and through the thermal management system to be cooled and recycled back through the first water transport plate 76 in a manner well known in the art, such as shown in U.S. Pat. No. 6,432,566 that issued on Aug. 13, 2002, and is owned by the assignee of all rights in the present invention.

The first water transport plate 76 may also define a plurality of first reactant flow channels 78 for directing a reactant from a first reactant inlet 80 to flow adjacent the first substrate layer 74. It is pointed out that the first reactant flow channels 78, and pore space within the first anode substrate 74 and first diffusion layer 72 cooperate to define a first flow field such as shown schematically in FIG. 1 at reference numeral 20. The reversible fuel cell power plant 10 however may include flow fields that consist of cavities, differing channels or grooves, etc, as is known in the art. The first water transport plate 76 may also define a plurality of first coolant feed channels 82A, 82B, 82C that direct a coolant stream to pass into the porous first water transport plate 76A.

The preferred fuel cell 62 shown in FIG. 2 also includes a second catalyst support means consisting of one or more porous layers, such as a second diffusion layer 84 secured adjacent to the second preferred catalyst 68, and a second substrate layer 86 secured adjacent to the second diffusion layer 84. The second preferred catalyst 68, second diffusion layer 84 and second substrate layer 86 may be cooperatively secured to define a second preferred electrode 87. A second water transport or cooler plate 88 may be secured adjacent to the second electrode support means, which second water transport plate 88 may define a plurality of second reactant flow channels 90 in fluid communication with a second reactant inlet 92 for directing a second reactant stream to flow adjacent to the second substrate layer 86. The second water transport plate 88 may also define a plurality of second coolant feed channels 94A, 94B, 94C for directing the coolant stream to flow into and through the second water transport plate 88. As with the first water transport plate 76, the second reactant flow channels 90, and pores within the second substrate layer 86 and second diffusion layer 84 may serve to define the second flow field shown schematically in FIG. 1 at reference numeral 22, and that flow field 22 may also be defined by alternate cavities, channels, etc., as is known in the art. The membrane electrode assembly 64, first diffusion layer 72, first substrate layer 74, first water transport plate 76, second diffusion layer 84, second substrate layer 86 second water transport plate may be constructed of materials known in the art, such as described in the aforesaid U.S. Pat. No. 6,432,566.

For efficient utilization within the reversible fuel cell power plant 10, in the preferred fuel cell 62 the first preferred catalyst 66 is virtually identical to the second preferred catalyst 68. For purposes herein, that means that the first preferred catalyst 66 and second preferred catalyst 68 have virtually identical compositions and virtually identical quantities of catalyst loading per unit area; have virtually identical support materials if the catalysts are supported for example and as is known on a carbon black material; have virtually identical masses; have virtually identical volumes; and, have virtually identical hydrophilicity to hydrophobicity ratios, meaning that the ratios of solid volume, liquid volume and gas volumes within the first catalyst 66 and second catalyst 68 are virtually the same.

Similarly, in the preferred fuel cell 62, the first diffusion layer 74, first substrate layer 74 and first water transport plate 76 are virtually identical to the second diffusion layer 84, second substrate layer 86 and second water transport plate 88 so that flow fields defined by those components are identical to each other. For purposes of clarity herein, having those components being virtually identical as described above will be referred to as the first flow field 20 being virtually identical to the second flow field 22. By having virtually identical first and second preferred catalysts 66, 68 and virtually identical first and second flow fields 20, 22, switching the first and second reactant streams into differing flow fields 20, 22 will facilitate consistent performance of the reversible fuel cell power plant 10. For purposes herein the phrase "virtually identical" means that any difference between components characterized as "virtually identical" will be no greater than a plus or minus 10 (ten) percent difference. As described above, in known fuel cells it is common to have oxidant catalysts and related oxidant side components be a different mass and/or volume than fuel catalysts and fuel side components. Therefore, the reversible fuel cell power plant 10 of the present invention represents a compromise in the design of the preferred catalysts 66, 68 and reactant flow fields 20, 22 wherein the volume and initial cost of the fuel cell power plant 12 may be increased in order to provide a reduction in life cycle cost for the power plant 12.

Figure 3A:
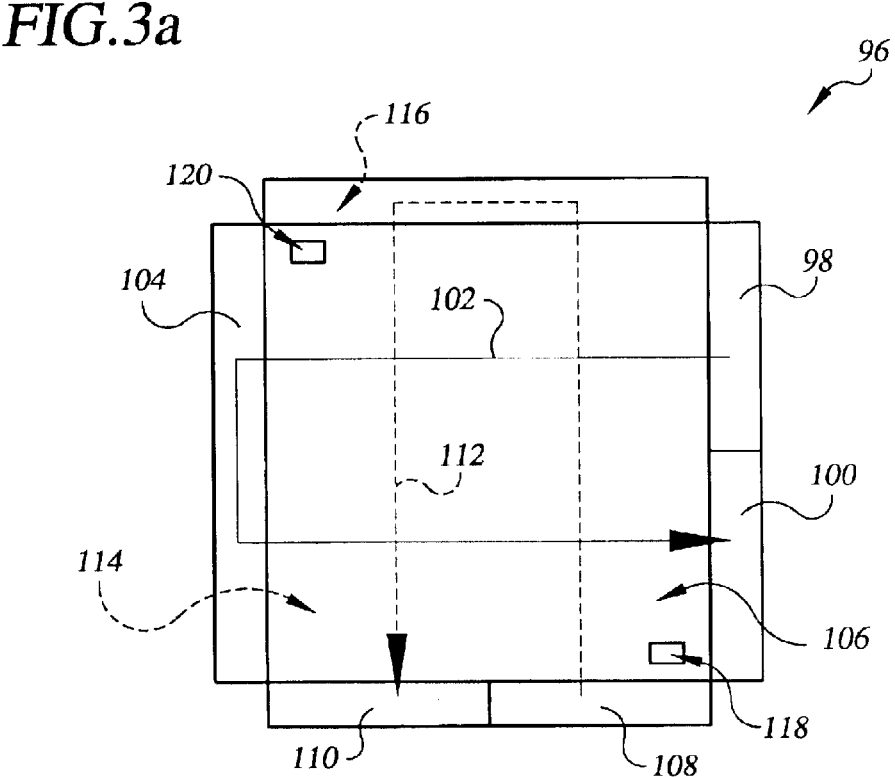
FIG. 3a. is a schematic, cross-section view of a fuel cell of the reversible fuel cell power plant showing a first flow pattern of first and second reactant streams moving through first and second flow fields of the fuel cell.

FIG. 3*a*. shows a cross section view of a second preferred fuel cell 96 appropriate for the reversible fuel cell power plant 10. The second preferred fuel cell 96 includes a preferred first flow field inlet 98, a preferred first flow field outlet 100, and a first reactant flow pattern 102, represented by a solid line passing from the first flow field inlet 98 to the first flow field outlet 100 through a first preferred flow field 106 and a first turn-around 104. The second preferred fuel cell 96 also includes a preferred second flow field inlet 108, a preferred second flow field outlet 110, and a second reactant flow pattern 112, represented by a hatched line passing from the second inlet 108 to the second outlet 110 through a second preferred flow field 114 (shown schematically below the first preferred flow field 106, and designated by the hatched lead line from reference numeral 114) and a second turn-around 116. Also shown in FIG. 3*a*. are a coolant inlet 118, and a coolant outlet 120.

Figure 3B:
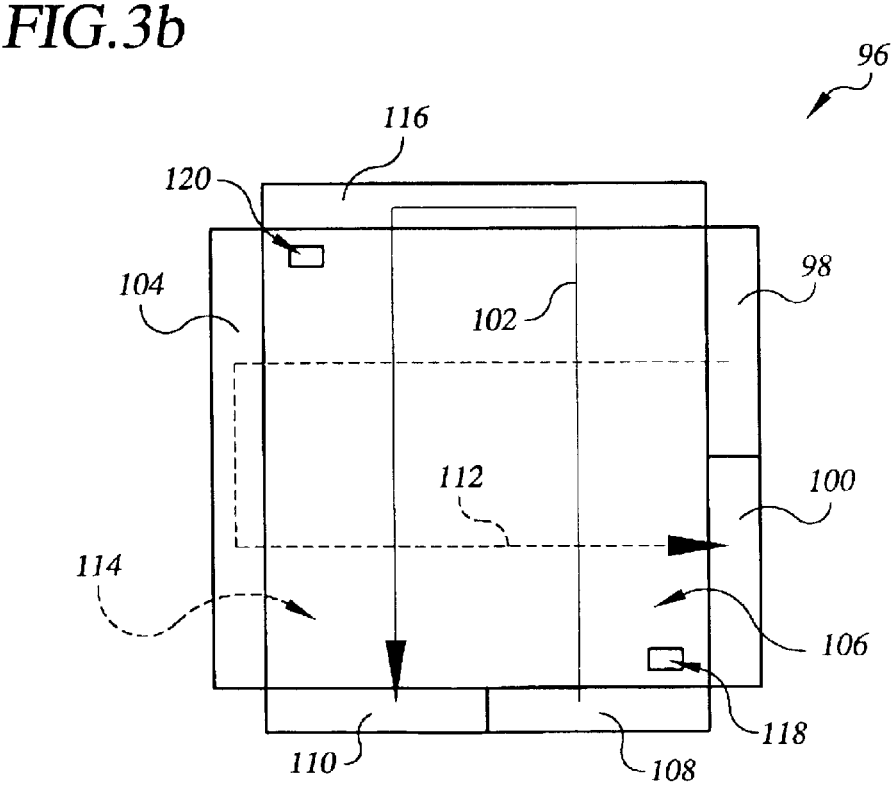
FIG. 3b. is a schematic, cross-section view of the FIG. 3a. fuel cell of the reversible fuel cell power plant showing a second flow pattern of the first and second reactant streams moving through the first and second flow fields.

FIG. 3*b*. shows the same second preferred fuel cell 96, but with the first reactant flow pattern 102 passing from the preferred second flow field inlet 108 to the preferred second flow field outlet 110 through the second preferred flow field 114, and the second reactant flow pattern 112 passing from the preferred first flow field inlet 98 to the preferred first flow field outlet 100 through the first preferred flow field 106. FIG. 3*a*. therefore shows the first and second reactant flow patterns 102, 112 moving through the first and second flow fields 106, 114 in a manner that represents the switch-over assembly means 48 set in the first position. FIG. 3*b*. in contrast shows the first and second reactant flow patterns 102, 112 moving through the first and second flow fields 106, 114 in a manner that represents the switch-over assembly means 48 set in the second position.

Figure 4:
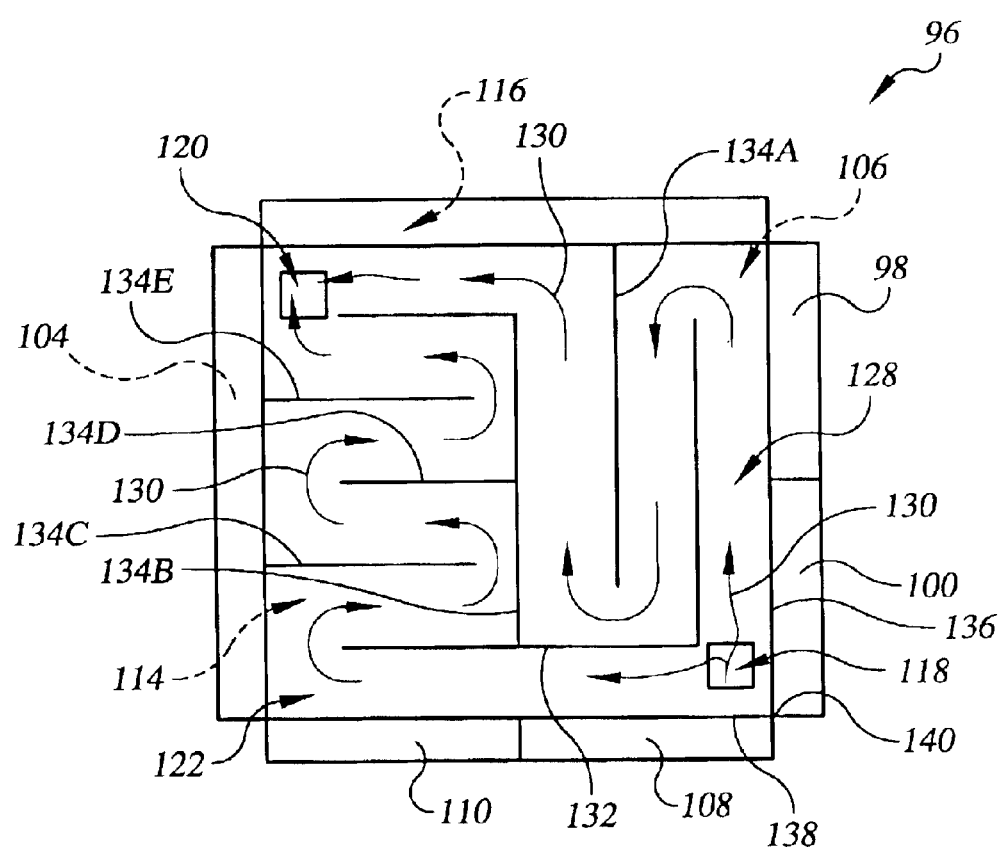
FIG. 4 is a schematic, cross-section view of a coolant flow field showing a flow pattern of a coolant stream moving through a split path coolant distribution channel of the coolant flow field.

FIG. 4 shows a coolant flow field 122 of the second preferred fuel cell 96 overlying the first preferred flow field 106 and second preferred flow field 114. (In FIG. 4, the first and second preferred flow fields 106, 114 are shown by hatched lines leading from those reference numerals as if the flow fields 106, 114 were under the coolant flow field 122. As is known in the art the second preferred fuel cell 96 would in virtually all circumstances be one of a plurality of fuel cells stacked into a well known fuel cell stack assembly, so that flow fields of another fuel cell would be on top of the coolant flow field 122.) A coolant stream passes from the coolant inlet 118 into the coolant flow field 122, through the coolant flow field 122, and into the coolant outlet 120 of the second preferred fuel cell 96. The coolant flow field 122 includes a coolant distribution means for directing flow of the coolant stream from the coolant inlet 118 to the coolant outlet 120. The coolant distribution means may take the form of discrete passages for directing flow of the coolant stream, or walls, barriers, etc., within the flow field 122 for directing flow of the coolant stream, as is known in the art.

A preferred coolant distribution means is a split path coolant distribution channel 128 defined within the coolant flow field 122 that directs some of a coolest portion of the coolant stream within the coolant flow field 122 to flow from the coolant inlet 118 over the first preferred reactant flow field outlet 100 and first preferred reactant flow field inlet 98, and that also directs some of a coolest portion of the coolant stream within the coolant flow field 122 to flow from the coolant inlet 118 over the second preferred reactant flow field inlet 108 and second preferred reactant outlet 110.

As described in U.S. Pat. No. 6,322,915 that issued on Nov. 27, 2001, and that is owned by the assignee of all rights in the present invention, by the phrase "coolest portion of the coolant stream" within or passing through the coolant flow field 122, it is meant to identify a portion of the coolant stream that is within one-third of a coolant flow path 130 closest to the coolant inlet 118. The "coolant flow path" 130 is the path the coolant stream takes moving through the coolant flow field 122. The coolant flow path 130 is shown in FIG. 4 as a plurality of arrowed lines, some of which are identified by the reference numeral 130, showing flow direction of the coolant stream along the coolant flow path 130 from the coolant inlet 118 to the coolant outlet 120. Additionally, by describing the coolest portions of the coolant stream as flowing "over" the described reactant inlets and outlets, it is meant that the coolest portions of the coolant stream are flowing as close as is possible to the described reactant inlets and outlets while remaining within the coolant flow field 122.

The split path distribution channel 128 that achieves the described flow of coolest portions of the coolant stream may be formed by use of an L-shaped barrier 132 positioned so that the junction of two branches of the L-shaped barrier 132 is adjacent the coolant inlet 118, as shown in FIG. 4. An additional plurality of coolant flow barriers 134A, 134B, 134C, 134D, 134E may be utilized as part of the coolant distribution means, as shown in FIG. 4, to enhance efficiency of removal of heat from the first and second preferred flow fields 106, 114. Additional configurations of the barriers 132, 134A, 134B, 134C, 134D, 134E or other barriers or channels known in the art may be utilized to achieve the described distribution of coolest portions of the coolant stream to flow over the described reactant inlets and outlets as well as to achieve efficient heat removal. As is known in the art, the described split path distribution channel 128 defined by the described barriers 132, 134A, 134B, 134C, 134D, 134E may be formed by a configuration of water feed channels within the first and second water transport plates 76, 88 shown in FIG. 2, by a coolant flow field 122 defined within a separate porous or sealed plate (not shown) secured adjacent the first or second flow fields 20, 22 of FIG. 1, or by any coolant flow field structures known in the art.

By having the split path distribution channel 128 direct the coolest portions of the coolant stream to flow over the first preferred reactant flow field inlet 98 and outlet 100 and second preferred reactant flow field inlet 108 and outlet 110, the second preferred fuel cell 96 enhances water balance. The coolest portions of the coolant stream will effectively minimize dew points of the reactant streams flowing through those reactant flow field inlets and especially outlets, so that evaporation into the reactant streams of water will be minimized. By minimizing water loss by evaporation into reactant streams moving through and out of the flow fields 106, 114 of the second preferred fuel cell 96, the fuel cell 98 will not lose more water than is generated at a cathode electrode, and therefore, the fuel cell 96 will remain in water balance.

As shown in FIGS. 3*a*., 3*b*., and 4, for further efficiency of operation of the second preferred fuel cell 96, the first reactant flow field inlet 98 and outlet 100 may be defined at a first edge 136 of the fuel cell 96, and the second reactant flow field inlet 108 and outlet 110 may be defined at a second edge 138 of the fuel cell 96, wherein the first and second edges 136, 138 contact each other to form a corner 140 so that the first and second preferred flow fields 106, 114 are non-circular. Because the flow fields 106, 114 are non-circular, the fuel cell 96 may provide for utilization of the reactant switch-over assembly 48 more efficiently than would circular flow fields in switching over flow of reactant streams between the first and second preferred flow fields 106, 114. Additionally, for efficient operation of a reversible fuel cell power plant, for directing flow of the reducing fluid fuel reactant stream and for directing flow of the oxygen containing reactant stream through the fuel cell 96 must be virtually identical to each other. For example, and as shown schematically in FIGS. 3a, 3b and 4, the first preferred reactant flow field inlet 98 and outlet 100 are identical to the second reactant flow field inlet 108 and outlet 110 in order to provide for virtually identical flow of either a reducing fluid fuel stream or an oxygen containing oxidant stream through the flow field inlets 98, 108 and outlets 100, 110.

The reversible fuel cell power plant 10 therefore provides for minimizing decay in performance of the plant 10 resulting from degradation of one of the two electrodes 75, 87. By switching the reactant streams over to differing flow fields 20, 22 after a first half of an estimated useful life span of the power plant 10, but before a final third of a useful life span of the plant 10, the electrode that was degrading more rapidly prior to he switch over will be replaced by the electrode that was degrading more slowly, thus improving the performance of the fuel cell 12 and thereby extending the life span of the fuel cell power plant 12. In determining an appropriate time to effect the described switch-over of the reactant streams as after a first half of the useful life span and before a final third, or in some circumstances, a final one quarter of the useful life span, it is stressed that the "useful life span" measurement would be for the fuel cell power plant 10 without implementing the reactant stream switch-over. A method of operating the reversible fuel cell power plant 10 may therefore also include the steps of measuring a useful life span of the fuel cell 12 without a reactant switch-over, then operating the plant 10 with the reactant switch-over assembly 48 in the first position, then after the first half of the useful life span but before the final one-quarter of the useful life span, operating the plant 10 with the switch-over assembly 48 in the second position.

It is also anticipated that the reversible fuel cell power plant 10 may actually increase a useful life span of the plant 10 by more than 100%, because certain elements of the decay of the plant 10 may actually be reversed. In particular, two elements of decay known in the art that may be reversed by the reactant stream switch-over by the fuel cell power plant 10 are electrode catalyst migration within the fuel cell 12 and wettability and de-wettability of elements of the FIG. 1 fuel cell 12.

While the present invention has been disclosed with respect to the described and illustrated embodiments, it is to be understood that the invention is not to be limited to those embodiments. For example, while the fuel cell 12 is described as including a proton exchange membrane electrolyte 18, the fuel cell 12 may include other electrolytes known in the art. Additionally, the invention has been described for flow fields that are porous and also used as water transport plates. However, the invention is equally applicable to fuel cells that utilize solid, bi-polar separator plates or other known designs. Accordingly, reference should be made primarily to the following claims rather than the foregoing description to determine the scope of the invention.

What is claimed is:

1. A method of operating a reversible fuel cell power plant (10) for generating electrical current from hydrogen containing reducing fluid and oxygen containing oxidant reactant streams, the reversible fuel cell power plant (10) including at least one fuel cell (12) having a first electrode (14) and a second electrode (16) secured to opposed surfaces of an electrolyte (18), having a first flow field (20) for directing a reactant stream to pass adjacent to the first electrode (14), and having a second flow field (22) for directing a reactant stream to flow adjacent to the second electrode (16) the method comprising the steps of:
   a. directing the reducing fluid fuel stream to flow into the first flow field (20) of the fuel cell (12), while simultaneously directing the oxygen containing oxidant stream to flow into the second flow field (22) of the fuel cell (12); and,
   b. then, directing the reducing fluid fuel stream to flow into the second flow field (22) of the fuel cell (12) while simultaneously directing the oxygen containing oxidant stream to flow into the first flow field (20) of the fuel cell (12).

2. The method of operating a reversible fuel cell power plant (10) of claim 1, comprising the further step of directing a coolant stream to flow from a coolant inlet (118) to a coolant outlet (120) of a coolant flow field (122) secured adjacent to the fuel cell (12) so that some of a coolest portion the coolant stream flows from the coolant inlet (118) over a first flow field inlet (98) and outlet (100), and some of the coolest portion of the coolant stream flows from the coolant inlet (118) over a second flow field inlet (108) and outlet (110), wherein the first flow field inlet (98) and outlet (100) direct a reactant stream into, through and out of the first flow field (106), and the second flow field inlet (108) and outlet (110) direct a reactant stream into, through and out of the second flow field (114).

3. The method of operating a reversible fuel cell power plant (10) of claim 1, comprising the further step of, prior to the step of directing the reducing fluid fuel stream to flow into the first flow field (20) while simultaneously directing the oxygen containing oxidant stream to flow into the second flow field (22), measuring a useful life span of the fuel cell (12) without a reactant switch-over, then, directing the reducing fluid fuel stream to flow into the first flow field (20) while simultaneously directing the oxygen containing oxidant stream to flow into the second flow field (22), then after one-half of the measured useful life span of the fuel cell (12) but prior to a final one-quarter of the measured useful life span of the fuel cell (12), directing the reducing fluid fuel stream to flow into the second flow field (22) while simultaneously directing the oxygen containing oxidant stream to flow into the first flow field (20).

4. A reversible fuel cell power plant (10) for generating electrical current from hydrogen containing reducing fluid fuel and oxygen containing oxidant reactant streams, the power plant comprising:
   a. at least one fuel cell (12) having a first electrode (14) and a second electrode (16) secured to opposed surfaces of an electrolyte (18), having a first flow field (20) for directing a reactant stream to pass adjacent to the first electrode (14), and having a second flow field (22) for directing a reactant stream to flow adjacent to the second electrode (16); and,
   b. a switch-over assembly means (48) secured in fluid communication between a reducing fluid fuel source (30), an oxygen containing oxidant source (24), and the first and second flow fields (20) (22), the switch-over assembly means (48) being secured for alternating between a first position wherein the switch-over assembly means (48) directs the reducing fluid fuel stream to flow into the first flow field (20) and directs the oxygen containing oxidant stream to flow into the second flow field (22), and a second position wherein the switch-over assembly means (48) directs the reducing fluid fuel stream to flow into the second flow field (22) and directs the oxygen containing oxidant stream to flow into the first flow field (20).

5. The reversible fuel cell power plant of claim 4, wherein the first electrode (14) includes a first catalyst (66) that is virtually identical to a second catalyst (68) of the second electrode (16).

6. The reversible fuel cell power plant of claim 5 wherein the first flow field (20) is virtually identical to the second flow field (22).

7. The reversible fuel cell power plant of claim 4, further comprising a coolant flow field (122) secured adjacent the fuel cell (96), the coolant flow field (122) including a coolant inlet (118), a coolant outlet (120) and coolant distribution means between the coolant inlet (118) and coolant outlet (120) for directing flow of a coolant stream between the coolant inlet (118) and coolant outlet (120), the coolant distribution means including a split path coolant distribution channel (128) that directs some of a coolest portion of the coolant stream within the coolant flow field (122) to flow from the coolant inlet (118) over a first flow field inlet (98) and outlet (100), and that directs some of the coolest portion of the coolant stream to flow from the coolant inlet (118) over a second flow field inlet (108) and outlet (110), wherein the first flow field inlet (98) and outlet (100) direct a reactant stream into, through and out of the first flow field (106), and the second flow field inlet (108) and outlet (110) direct a reactant stream into, through and out of the second flow field (114).

8. The reversible fuel cell power plant 10) of claim 4, wherein the first flow field inlet (98) and outlet (100) are defined at a first edge (136) of the fuel cell (96) and the second flow field inlet (108) and outlet (110) are defined at a second edge (138) of the fuel cell (96), and the first edge (136) and second edge (138) contact each other to define a corner (140) so that the first flow field (106) and second flow field (114) are non-circular.

9. The reversible fuel cell power plant (10) of claim 4, wherein a first flow field (106) inlet (98) is virtually identical to a second flow field (114) inlet (108) and a first flow field (106) outlet (100) is virtually identical to a second flow field (114) outlet (110).

10. The reversible fuel cell power plant (10) of claim 4, wherein the electrolyte (18) is a proton exchange membrane electrolyte.

* * * * *